C. H. SHAFFER.
ELECTRIC BLOCK SYSTEM FOR RAILWAYS.
APPLICATION FILED APR. 1, 1907.
914,461.
Patented Mar. 9, 1909.
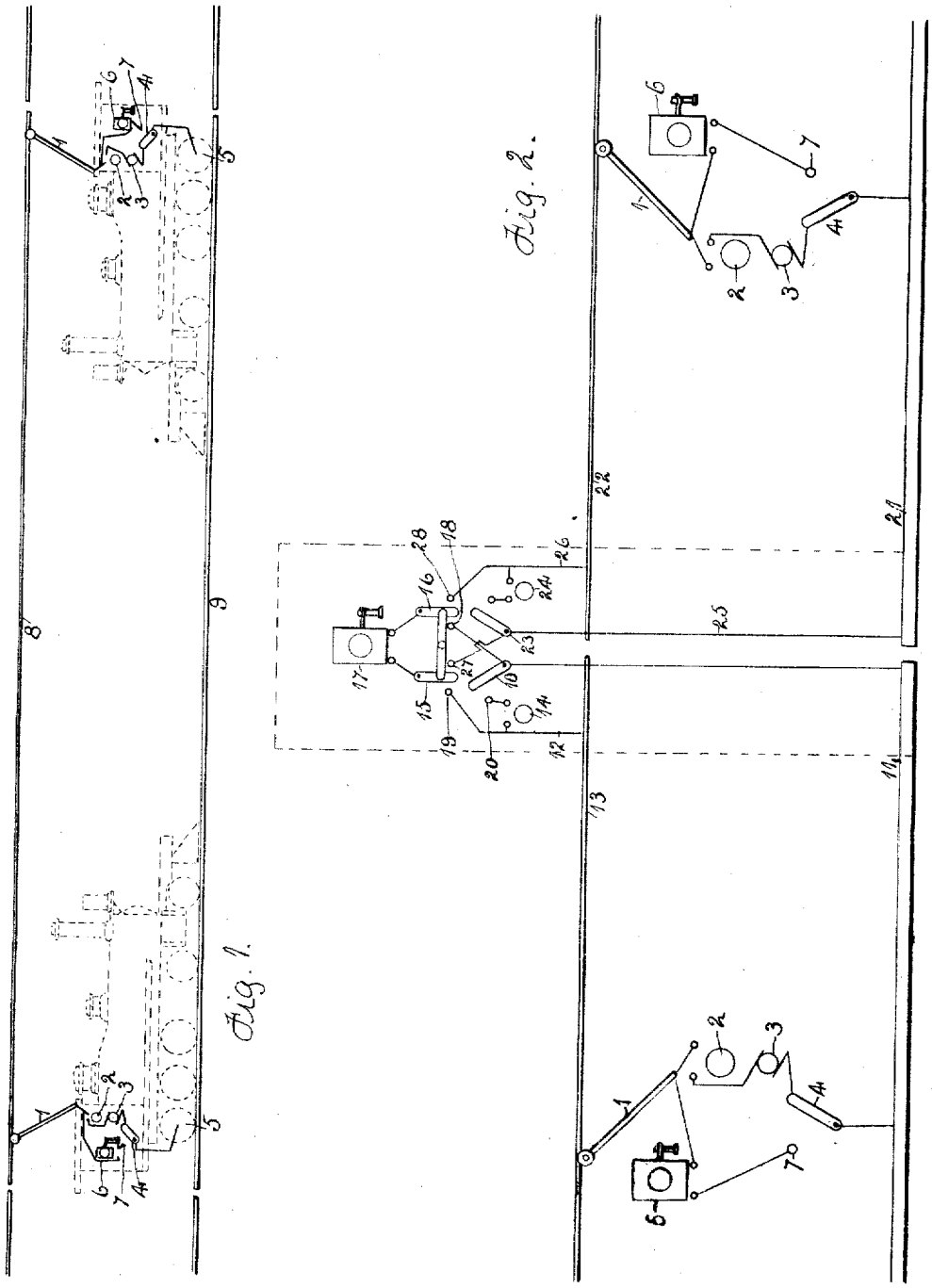

UNITED STATES PATENT OFFICE.

CHARLES H. SHAFFER, OF MUSKEGON, MICHIGAN.

ELECTRIC BLOCK SYSTEM FOR RAILWAYS.

No. 914,461.

Specification of Letters Patent.

Patented March 9, 1909.

Application filed April 1, 1907. Serial No. 355,739.

*To all whom it may concern:*

Be it known that I, CHARLES H. SHAFFER, citizen of the United States, residing at Muskegon, in the county of Muskegon and State of Michigan, have invented new and useful Improvements in Electric Block Systems for Railways, of which the following is a specification.

The object of this invention is to construct an electric block system for railways in which a sectional trolley wire is employed so that when two trains occupy the same section of trolley wire both engineers of the trains will be instantly notified of the fact.

The further object of this invention is to enable the operator in the block house to signal the engineer in the blocks to either side of his house and get in telephonic communication with such engineers.

In the accompanying drawings, Figure 1 illustrates my improved system in which the two locomotives are shown in dotted lines and approaching one another, the electric system shown in solid lines. Fig. 2 shows the outline of a block house in dotted lines and the electric system of the block house and two locomotives being shown in solid lines.

Most of the accidents in railway systems have occurred by allowing two trains to occupy a block at the same time, and in many instances the operator in the block house discovers his mistake after it is too late, and he having no means at his command by which he could get in communication with the engineers of trains a collision was inevitable.

By my system all locomotives carry an electrical equipment in order that the engineers of any two locomotives may get into immediate telephonic communication with each other when their locomotives occupy the same block. This arrangement is independent of the system by which the operator may get into communication with either engineer as above stated.

To each locomotive is connected a trolley pole 1; this trolley pole is electrically connected with the bell 2; the bell is electrically connected with the generator 3, the generator is electrically connected with the switch 4; the switch is electrically connected with the frame of the locomotive, in this instance the wheel 5 and thence to the track. A side circuit is formed from the trolley pole 1 through the telephone 6 and thence to the button 7. The trolley wire 8 is in sections the length of a block. The trolley pole 1 is intended to engage the trolley wire. The rails 9 equivalent to the length of the trolley wire or blocks are electrically connected, but are insulated at the ends of the blocks, in order that a more sure system may be had.

When only one locomotive is occupying a block at a time, the circuit will be broken at the ends of the trolley wire and rails of the block. Should another locomotive enter a block occupied by another locomotive, the electrical circuit would be instantly closed through the systems of both locomotives which would ring the bells in both locomotives, the engineers would then know that danger was imminent and would stop their trains, would then throw the switch 4 onto the button 7 which would cut out the alarm circuit and cut in the telephone circuit when the engineers could talk with one another and ascertain the trouble and give direction for further movement.

Some accidents happen by the operator in the block house permitting a train to enter a block when he was aware of some danger ahead, for instance, a destroyed bridge or washout. I have provided a system in connection with the system carried by the locomotive by which the operator can notify the engineer of the train he has allowed to enter the block to stop, when telephonic communication may be obtainable between the operator and engineers. This is accomplished by an electrical circuit for the block each side of the block house. One of these systems comprises the switch 10 located in the block house and electrically connected with the rail 11. A wire 12 has a connection with the trolley wire 13. A bell 14 is electrically connected with the wire 12. A double throw switch composed of the bars 15 and 16 is also located in the block house and both bars connected with the telephone 17. A button 18 is electrically connected with the switch 10 and the wire 12 connects with the button 19. Should the operator in the block house desire communication with the engineer in the locomotive occupying the block composed of the rail 11 and trolley wire 13, he throws the switch 10 onto the button 20 connected with the bell 14 and through it with the wire 12 which connects with the trolley wire. This has the effect of closing the circuit through the instruments in the locomotive, which will cause the bell 2 of the locomotive and the bell 14 in the block house to ring which will notify both the engineer and operator that the signal has been given, the operator then removes the switch 10 from the button 20 and throws the double switch onto the buttons 18 and 19 which will cut in the telephone 17 and by this time the engineer has cut in his telephone as before described when a conversation may be carried on and the engineer warned of the danger ahead.

The block composed of the rail 21 and trolley wire 22 for the other side of the block house is similarly connected by the switch 23, bell 24, wires 25 and 26, and buttons 27 and 28, the former connected with the switch 23, and the latter with the wire 26. The switch 23 closes the circuit through the bell 24, trolley wire 26 and rails 25 through the apparatus located in the cab of the locomotive, and the double switch moved onto the buttons 27 and 28 will enable the telephonic communication as above described in connection with the block composing the rails 11 and trolley wire 13.

It has been made clear that there will be no occasion for a collision between trains unless the engineers disregard the ringing of the alarm bell, and should the operator in the block house, for any purpose desire to communicate with the engineer in the cab of the locomotive in either of the blocks controlled by him, he can do so.

I claim as my invention.

In an electric block signal system, rails, a trolley wire extending parallel thereto, and divided into sections constituting blocks, a station at the junction of two blocks, signaling instruments in said station, connected, one to the trolley wire section of each block, a telephone instrument also in said station, means for connecting said telephone instrument with the trolley wire section of either block as desired, and disconnecting the signaling instruments therefrom, and electrical apparatus carried by a train, and connected so as to coöperate with that at the station.

In testimony whereof I have hereunto set my hand in presence of two subscribing witnesses.

CHARLES H. SHAFFER.

Witnesses:
HENRY D. MAHER,
JAMES M. HOYT.